US012804070B2

(12) United States Patent
Mohammed et al.

(10) Patent No.: US 12,804,070 B2
(45) Date of Patent: Nov. 17, 2026

(54) MITIGATING CALL SETUP DISRUPTIONS

(71) Applicant: T-MOBILE INNOVATIONS LLC, Overland Park, KS (US)

(72) Inventors: Zain Us Salekin Mohammed, Bellevue, WA (US); Sireesha Naga Panchagnula, Bellevue, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 793 days.

(21) Appl. No.: 18/306,612

(22) Filed: Apr. 25, 2023

(65) Prior Publication Data

US 2024/0364810 A1 Oct. 31, 2024

(51) Int. Cl.
*H04M 3/08* (2006.01)
*H04L 41/0631* (2022.01)
*H04M 3/523* (2006.01)

(52) U.S. Cl.
CPC ........ *H04M 3/085* (2013.01); *H04L 41/0631* (2013.01); *H04M 3/523* (2013.01)

(58) Field of Classification Search
CPC .... H04M 3/085; H04M 3/523; H04L 41/0631
See application file for complete search history.

(56) References Cited

U.S. PATENT DOCUMENTS 7,450,563 B2 * 11/2008 Cook ...................... H04L 12/66 370/352
9,001,682 B2 * 4/2015 Kovvali ............ H04W 28/0865 370/252
9,060,366 B2 * 6/2015 Lau ........................ H04W 76/25
9,413,666 B2 * 8/2016 Vaidya ..................... H04L 47/11
9,769,794 B1 * 9/2017 Sitaram ........... H04W 36/00224
10,097,329 B2 * 10/2018 Chiang ................. H04W 72/04
10,097,694 B1 * 10/2018 Salisbury ................ H04L 65/80
10,367,863 B2 * 7/2019 Patel .................... H04L 65/1104
12,452,123 B2 * 10/2025 Ozkan ................. G06F 11/0709
2010/0029266 A1 * 2/2010 van Gassel ............. H04L 65/80 455/424
2013/0287198 A1 * 10/2013 Kotecha ................ H04W 76/19 379/207.02
2018/0234550 A1 * 8/2018 Lifson ................... H04M 7/006

* cited by examiner

*Primary Examiner* — Lisa Hashem
(74) *Attorney, Agent, or Firm* — SHOOK, HARDY & BACON L.L.P.

(57) ABSTRACT

Embodiments of the present disclosure are directed to systems and methods for mitigating disruptions to telecommunications networks. A call setup time is determined from a network perspective. If the call setup time is sufficiently long, one or more corrective actions are taken in order to identify and/or resolve a network problem that could be contributing to the long call setup time. The corrective action(s) can include comparing call setup time performance by geographic region, comparing network-observed call setup times to user equipment-observed call setup times, and/or initiating cell reselection procedures, for example.

15 Claims, 3 Drawing Sheets

MITIGATING CALL SETUP DISRUPTIONS

SUMMARY

The present disclosure is directed to systems and methods for mitigating disruptions to call setup procedures in a telecommunications network, substantially as shown in and/or described in connection with at least one of the Figures, and as set forth more completely in the claims.

According to various aspects of the technology, an amount of time taken to set up a call between user equipment (UE) devices in a telecommunications network ("call setup time") is determined, and if the call setup time exceeds a threshold, one or more corrective actions are taken. Unlike traditional methods, which measure call setup time from the perspective of a UE, the technology described herein measures call setup time from the perspective of the network, which, in aspects, is helpful for identifying and fixing malfunctioning network components. In order to identify and/or fix the malfunctioning network components, the present disclosure utilizes a variety of methods, such as comparing performance of network components in different geographic regions, comparing performance of radio access network (RAN) nodes that utilize one or more of the same network components, and comparing network-observed call setup time to UE-observed call setup time. These approaches allow network issues to be resolved in a faster, more accurate manner as compared to conventional methods.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, wherein.

DETAILED DESCRIPTION

Figure 1:
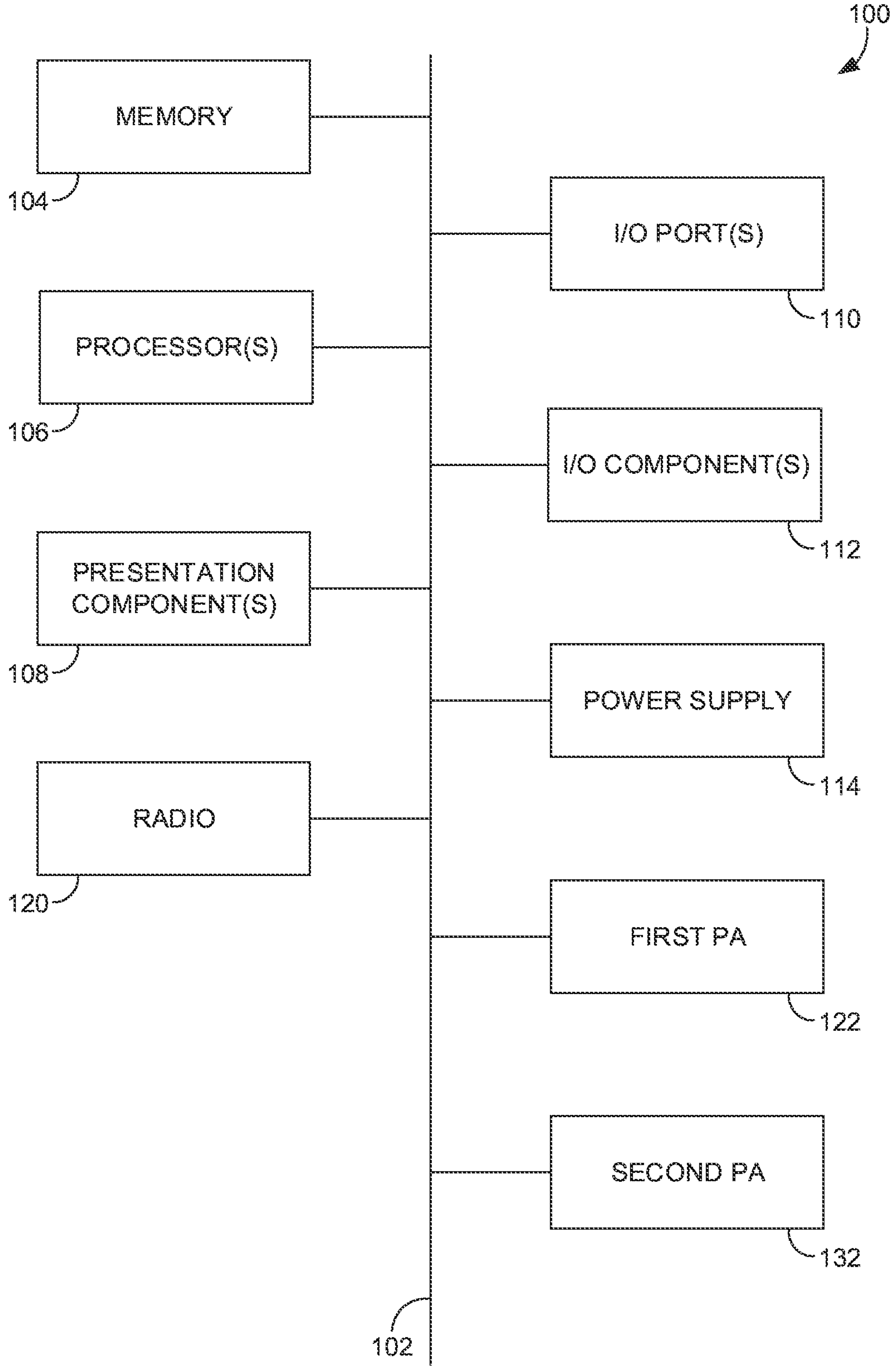
FIG. 1 illustrates an exemplary computing device for use with the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022). As used herein, the term "base station" refers to a centralized component or system of components that is configured to wirelessly communicate (receive and/or transmit signals) with a plurality of stations (i.e., wireless communication devices, also referred to herein as user equipment (UE(s))) in a geographic service area. A base station suitable for use with the present disclosure may be terrestrial (e.g., a fixed/non-mobile form such as a cell tower or a utility-mounted small cell) or may be extra-terrestrial (e.g., an airborne or satellite form such as an airship or a satellite).

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and nonvolatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media. Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions-including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, call setup time is the amount of time that elapses between a UE's request to initiate a call and the UE's receipt of an indication that the call recipient's device has received the request (e.g., is ringing). Call setup time is one metric used to benchmark mobile network performance. Long call setup times can, for example, be symptomatic of problems with one or more network components. As such, telecommunication service providers must be able to identify, diagnose, and troubleshoot abnormally long call setup times.

Conventionally, call setup time is measured from the perspective of a UE. For example, some UEs measure call setup time by calculating a difference between a first time at which a call initiation request was transmitted from the UE and a second time at which a call delivery indication was received by the UE. There are two problems with this approach. First, the resulting call setup data may be inaccessible to telecommunication service providers—e.g., because the UE formats or stores the data in a manner foreign to the service provider or because the UE does not provide the service provider with the call setup data at all. Second, when measured from the perspective of a UE, call setup time necessarily depends not just on network performance, but on RF channel performance and the UE's performance. For example, if the UE is equipped with a low-quality antenna, a call setup time could be long even if the network is performing properly.

In contrast to conventional approaches, the present solution is directed to measuring call setup time in a manner specific to the network and mitigating underlying network problems by taking one or more corrective actions. In aspects, the solution comprises determining a first time at which a telephony application server (TAS) receives a call initiation indication and a second time at which the TAS receives a call delivery indication. Alternatively, the solution can comprise determining a first time at which a first RAN node receives a call initiation indication and a second time at which a second RAN node (which can be the first RAN node) transmits a call delivery indication. In either case, if the difference exceeds a threshold (e.g., three seconds), one or more corrective actions can be taken. For example, the corrective action(s) can include comparing performance of network components in different geographic regions, comparing performance of RAN nodes that utilize one or more of the same network components, and/or comparing network-observed call setup time to UE-observed call setup time.

Accordingly, a first aspect of the present disclosure is directed to a method for mitigating disruptions to a telecommunications network. The method comprises determining a setup time for a call between a first UE and a second UE, determining that the setup time for the call is above a threshold, and based on the determining that the setup time is above the threshold, performing a corrective action.

A second aspect of the present disclosure is directed to a computerized system comprising one or more processors and a non-transitory computer storage media storing computer-usable instructions that, when used by the one or more processors, cause the one or more processors to: determine a setup time for a call between a first UE and a second UE, determine that the setup time for the call is above a threshold, and based on the determining that the setup time is above the threshold, perform a corrective action.

Another aspect of the present disclosure is directed to one or more computer storage media storing computer-usable instructions that, when used by the one or more processors, cause the one or more processors to: determine a setup time for a call between a first UE and a second UE, determine that the setup time for the call is above a threshold, and based on the determining that the setup time is above the threshold, perform a corrective action.

Referring to FIG. 1, an exemplary computer environment is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 may be referred to herein as a user equipment, wireless communication device, or user device, The computing device 100 may take many forms; non-limiting examples of the computing device 100 include a fixed wireless access device, cell phone, tablet, internet of things (IoT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, non-removable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

A first radio 120 and second radio 130 represent radios that facilitate communication with one or more wireless networks using one or more wireless links. In aspects, the first radio 120 utilizes a first transmitter 122 to communicate with a wireless network on a first wireless link and the second radio 130 utilizes the second transmitter 132 to communicate on a second wireless link. Though two radios are shown, it is expressly conceived that a computing device with a single radio (i.e., the first radio 120 or the second radio 130) could facilitate communication over one or more wireless links with one or more wireless networks via both the first transmitter 122 and the second transmitter 132. Illustrative wireless telecommunications technologies include CDMA, GPRS, TDMA, GSM, and the like. One or both of the first radio 120 and the second radio 130 may carry wireless communication functions or operations using any number of desirable wireless communication protocols, including 802.11 (Wi-Fi), WiMAX, LTE, 3G, 4G, LTE, 5G, NR, VOLTE, or other VOIP communications. In aspects, the first radio 120 and the second radio 130 may be configured to communicate using the same protocol but in other aspects they may be configured to communicate using different protocols. In some embodiments, including those that both radios or both wireless links are configured for communicating using the same protocol, the first radio 120 and the second radio 130 may be configured to communicate on distinct frequencies or frequency bands (e.g., as part of a carrier aggregation scheme). As can be appreciated, in various embodiments, each of the first radio 120 and the second radio 130 can be configured to support multiple technologies and/or multiple frequencies; for example, the first radio 120 may be configured to communicate with a base station (e.g., a RAN node) according to a cellular communication protocol (e.g., 4G, 5G, 6G, or the like), and the second radio 130 may configured to communicate with one or more other computing devices according to a local area communication protocol (e.g., IEEE 802.11 series, Bluetooth, NFC, z-wave, or the like).

Figure 2:
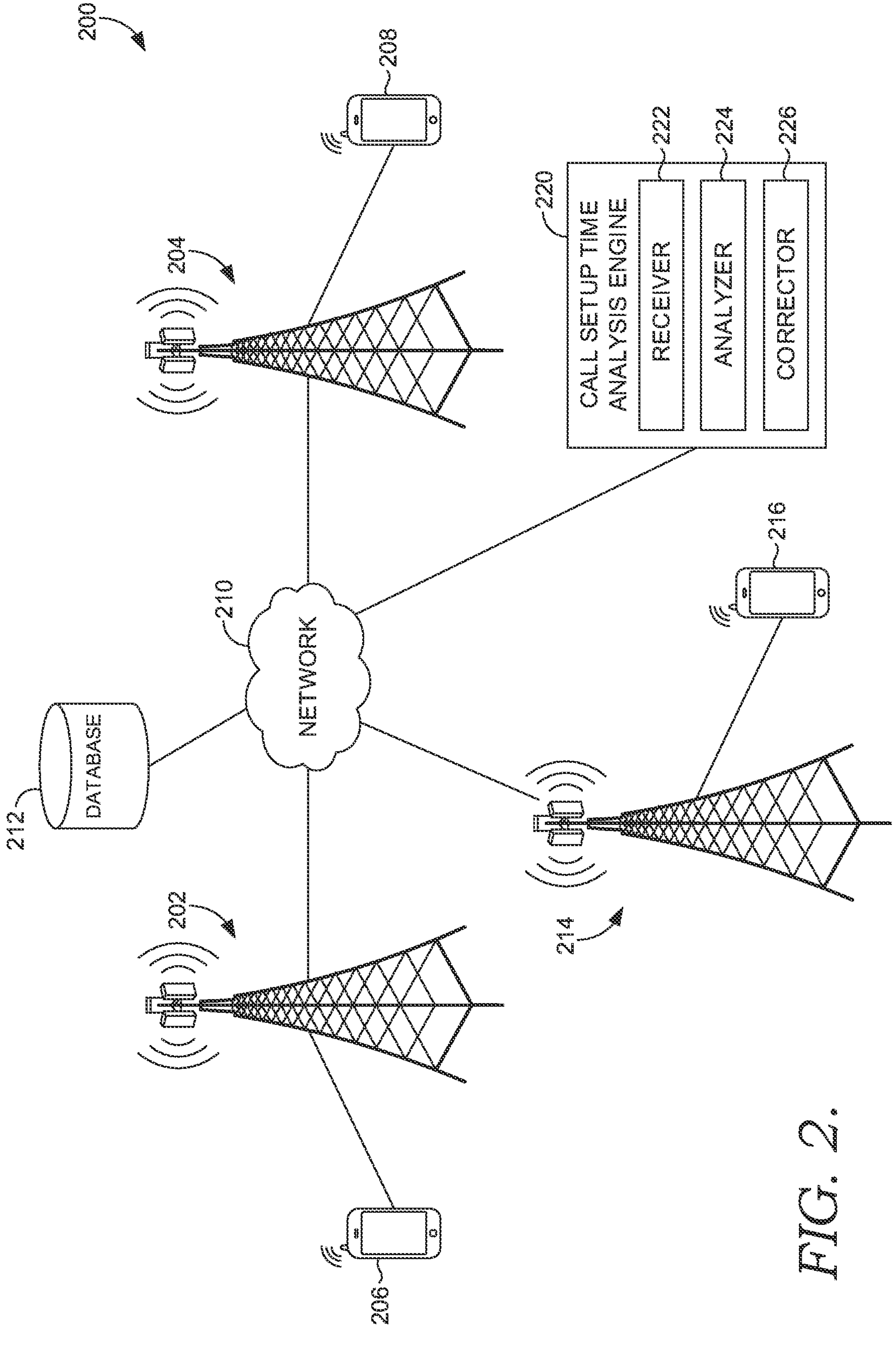
FIG. 2 illustrates a diagram of an exemplary network environment in which implementations of the present disclosure may be employed.

FIG. 2 depicts one example network environment in which implementations of the present disclosure may be employed. Such a network environment is illustrated and designated generally as a network environment 200. The network environment 200 is but one example of a suitable network environment and is not intended to suggest any limitation as to the scope of use or functionality of the invention. Neither should the network environment 200 be interpreted as having any dependency or requirement relating to any one or combination of components illustrated. The network environment 200 of FIG. 2 comprises a first RAN node 202, a second RAN node 204, a first UE 206, a second UE 208, a network 210, a database 212, a third RAN node 214, and a UE 216. The network environment 200 may also be said to include one or more computer processing components that form a call setup time analysis engine 220.

The network environment 200 comprises at least one RAN node (e.g., 202, 204, and/or 214) that is configured to wirelessly communicate with one or more user devices, such as the computing device 100 of FIG. 1, which may take the form of the first UE 206, the second UE 208, and/or the third UE 216. A RAN node may take the form of a cellular node (e.g. eNodeB, gNodeB, etc.), a relay, an access point (e.g., a Wi-Fi router), or any other desirable emitter and/or receiver of signals that transmits and/or receives wireless signals to/from one or more UEs. A suitable RAN node is not protocol-specific, it may be configured to be any wireless telecommunication protocol that is compatible with any of the UEs 206, 208, and/or 216, such as 4G, 5G, 6G, 802.11x, or any other wireless standard. A suitable RAN node is also not exclusive to cellular telecommunication networks; it may take the form of any wireless communication system and be used at any desirable frequency (e.g., microwave relays). RAN nodes consistent with the present disclosure may be configured to provide coverage to certain geographic service area and will have one or more backhaul connections that connect the RAN node to a broader telecommunications and/or information network, such as the network 210, for the provision of telecommunication and/or information service (s) to any of the UEs 206, 208, and/or 216. As illustrated, the RAN nodes 202, 204, 214 may take the form of a macro cell; however, the RAN nodes 202, 204, 214 may take any desirable form, such as a small cell, or a residential Wi-Fi router. As seen in the embodiment illustrated by FIG. 2, RAN nodes suitable for use in the present disclosure may be terrestrial (i.e., coupled to the earth via a tower or some other structure, such as the RAN nodes 202, 204, 214); alternatively, a suitable RAN node may be extra-terrestrial (i.e., coupled to an aircraft or a satellite).

The network environment 200 comprises the network 210. The network 210 comprises any number of components that are generally configured to provide voice and/or data services to wireless communication devices, such as the any of the UEs 206, 208, 216, which are wirelessly connected to one or more of the RAN nodes 202, 204, 214. For example, the network 210 may comprise one or more additional wireless RAN nodes, a core network, an IMS network, a PSTN network, or any number of servers, computer processing components, and the like. The network 210 may include access to the World Wide Web, internet, or any number of desirable data sources which may be queried to fulfill requests from wireless communication devices that make requests via the RAN nodes 202, 204, 214.

The network environment 200 comprises one or more UEs, with which the RAN node 202 connects to the network 210. Generally, each of the first UE 206 and the second UE 208 may have any one or more features or aspects described with respect to the computing device 100 of FIG. 1. For the purposes of the present disclosure, the first UE 206 and/or the second UE 208 utilize a wireless data connection with the RAN node(s) 202, 204, 214 in order to request, connect to, or conduct a call, for example. Accordingly, the first UE 206 may be said to have a first wireless connection with the RAN node 202 and the second UE 208 may be said to have a second wireless connection with the RAN node 204. The first UE 206 and the second UE 208 are physically located within geographic service areas served by the RAN nodes 202 and 204, respectively.

The network environment 200 comprises one or more computer processing components that form the call setup time analysis engine 220 (the "engine"). The call setup time analysis engine 220 may comprise one or more components, taking the form of any combination of hardware components, logical components, and computer-programmed services running on one or more computer processing components that are generally configured to receive and analyze call setup time data and/or take one or more corrective actions. The engine 220, including its one or more subcomponents, may be disposed at or near the RAN node(s) 202 and/or 204, within or adjacent to the network 210, or disposed in multiple locations. As discussed in the present disclosure, the subcomponents of the engine 220 are divided by function; however, more or fewer components may carry out the functions of the engine 220, and the functionality described herein with respect to particular subcomponents of the engine 220 may be performed by other subcomponents of the engine 220 without departing from the inventive concept(s) conceived herein. Accordingly, the engine 220 may be said to comprise a receiver 222, an analyzer 224, and a corrector 226.

The receiver 222 of the engine 220 is generally responsible for receiving data associated with communications in a wireless telecommunications network—e.g., the network 210. In aspects, the data can include any type of information associated with communications in a wireless telecommunications network that is suitable for use in the systems and methods disclosed herein. For instance, in an aspect, the data can comprise a call detail record (CDR). The CDR can be a collection of information associated with a telecommunication event (e.g., a phone call) in the network 210 and can include any or all properties of the telecommunication event, including, but not limited to: a time at which a call initiation indication was received from an originating UE, a time at which a call delivery indication was transmitted to the originating UE, a duration of a call, an identification of how a call was terminated (e.g., the terminating party did or did not receive the call, the call went to voicemail, etc.), subscriber information, device information, network information, location information, and the like.

The data associated with communications in a wireless telecommunications network can be generated by a server associated with the network 210—e.g., the core network. In an aspect, the server can include a telephony application server (TAS). In the same or alternative aspects, the data associated with communications in a wireless telecommunications network can comprise CDRs generated by a TAS. In an aspect, the TAS can be associated with a core network component—e.g., an Internet protocol (IP) multimedia subsystem (IMS).

The data associated with communications in a wireless telecommunications network can be received or retrieved from a database associated with the network, such as the database 212 associated with the network 210. In aspects, the database 212 can include any information that is relevant to aid and/or facilitate one or more actions of the engine 220. In one aspect, the database 212 can include data associated with communications in a wireless telecommunications network that have been aggregated according to one or more attributes, such as time interval, geographical location, and/or any other CDR data field. In the same or alternative aspects, the database 212 may include any threshold value(s) used by the engine 220 or a component thereof.

In aspects, the analyzer 224 determines a call setup time—e.g., from the perspective of the network 210. The analyzer 224 can determine the call setup time using any of the data received by the receiver 222 and/or stored in the database 212, for example.

A call begins when the first UE 206 transmits a call initiation indication to set up a call with the second UE 208. As used herein, the term "call initiation indication" refers to a communication that initiation of a call has been requested. In aspects, the call initiation indication is received by the first RAN node 202. The first RAN node relays the call initiation indication to the network 210. The first RAN node 202 may also provide, to the network 210, a first timestamp at which the first RAN node 202 received the call initiation indication, which may be stored in a CDR and/or the database 212, as previously discussed. Additionally, the network 210 can determine and store in the CDR and/or database 212 a second timestamp at which the network 210 received (e.g., at a TAS) the call initiation indication from the first RAN node 202. The network 210 relays the call initiation indication to the second RAN node 204 (which can be the same as the first RAN node 202, depending on the physical location of the second UE 208). The second RAN node 204, in turn, transmits the call initiation indication to the second UE 208. In response, the second UE 208 communicates a call delivery indication to the second RAN node 204. As used herein, the term "call delivery indication" refers to an indication that the second (e.g., receiving) UE 208 has received a request to join a call. A common example of a call delivery indication is a "180 ringing" message. The second RAN node 204 communicates the call delivery indication to the network 210, which routes the call delivery indication to the first RAN node 202. Additionally, the network 210 can determine and store in the CDR and/or database 212 a third timestamp at which the network 210 transmitted the call delivery indication to the first RAN node 202. The first RAN node 202 transmits the call delivery indication to the first UE 206 and, in aspects, transmits, to the network 210, a fourth timestamp at which the call delivery indication was transmitted to the first UE 206 (e.g., to be stored in the CDR and/or the database 212). Finally, the first UE 206 receives the call delivery indication (e.g., begins ringing).

In aspects, the analyzer 224 determines the call setup time by determining a difference between the second timestamp and the third timestamp—that is, (a) a first time at which the network 210 received (e.g., at a TAS) the call initiation indication from the first RAN node 202 and (b) a second time at which the network 210 transmitted the call delivery indication to the first RAN node 202. In other aspects, the analyzer 224 determines the call setup time by determining a difference between the first timestamp and the fourth timestamp—that is, (a) a first time at which the call initiation indication for the call was received from the first UE 206 at the first RAN node 202 and (b) a second time at which the call delivery indication for the call was transmitted from the second RAN node 204 to the first UE 206. In contrast, conventional methods would measure the call setup time from the perspective of the first UE 206—i.e., would determine the call setup time by calculating a difference between a time the first UE 206 transmitted the call initiation indication and a time the first UE 206 received the call delivery indication.

In aspects, the analyzer 224 is further configured to compare the call setup time to a threshold. The threshold can be a duration of time—e.g., three seconds—and can be stored in the database 212 (and received by the receiver 222). If the call setup time is below the threshold, the analyzer 224 may take no action. But if the call setup time is above the threshold, the analyzer 224 may instruct the corrector 226 to perform one or more corrective actions.

The corrector 226 can perform one or more corrective actions—e.g., in response to the call setup time being above the threshold. For example, in some aspects, the corrector communicates an alert, which can be displayed at a graphic user interface (GUI). The alert can comprise information regarding the setup time for the call (e.g., "13-second call setup time"), information regarding the nature of the problem (e.g., that a call setup time was abnormally long), location information for the UE(s) involved in the call, and/or device information for the UE(s) involved in the call, for example. The graphical user interface can also present aggregated statistics regarding a plurality of call setup times that exceeded the threshold.

In the same or other aspects, the corrector 226 identifies a malfunctioning component of the network 210. The corrector 226 can use any of a number of methods in order to determine that a particular component (or plurality of components) is malfunctioning.

For example, in some aspects, the corrector 226 compares one or more call setup times for the first RAN node 202 to one or more call setup times for a third RAN node, such as a third RAN node 214 that uses one or more components of the network 210 used by the first RAN node 202 (or the second RAN node 204). For instance, the corrector 226 can determine that the one or more call setup times for the third RAN node 214 (e.g., for one or more calls originating from a UE 216 in communication with the third RAN node 214), or a mean or median thereof, is/are below the threshold. Accordingly, the corrector 226 can determine that the first RAN node 202 (or the second RAN node 204) is malfunctioning. Put another way, if one RAN node is experiencing abnormally high call setup times and another is not, and both RAN nodes share the same network component(s), the corrector 226 may infer that the RAN node experiencing abnormally high call setup times is malfunctioning.

Continuing with the above example, the corrector 226 may instead determine that the one or more call setup times for the third RAN node 214 (or a mean or median thereof) is/are above the threshold. In this case, because the first RAN node 202 and the third RAN node 214 share the one or more network components, the corrector 226 may determine that one or more of the one or more network components is malfunctioning.

As another example, in some aspects, the corrector 226 performs one or more corrective actions based on a geographic location of the first UE 206. The corrector 226 can determine a geographic region of the first UE 206—e.g., a physical location or region in which the first UE 206 was present at the time it transmitted the call initiation indication. Information regarding the first UE's 206 geographic region or location can be retrieved from the database 212 and/or the CDR (e.g., by the receiver 222). In some aspects, the corrector 226 (and/or the receiver 222) further determines and/or obtains call setup time information for one or more other calls that originated from the first UE's 206 geographic region (e.g., from one or more CDRs) using any of the methods previously described in regard to the call between the first UE 206 and the second UE 208, for example. Then, the corrector 226 (and/or the analyzer 224) can analyze the call setup data for the one or more other calls—e.g., by computing an average (i.e., mean) setup time for the calls.

In aspects, the average setup time for the calls initiated in the first UE's 206 geographic region are compared against an average setup time for calls initiated in a second geographic region. The second geographic region can be disjoint from (e.g., different than) the first UE's 206 geographic region. The average call setup time for the second geographic region can be determined in the same manner described above in regard to the first UE's 206 geographic region, for example. If the average setup time for the calls initiated in the first UE's 206 geographic region is greater than the average setup time for the calls initiated in the second geographic region, the corrector 226 can identify a component of the network located in the first geographic region as a cause of delays in call setup processes. In another aspect, the corrector 226 can determine that the average call setup time in the first UE's 206 geographic region is greater than the average call setup time in the second geographic region by at least a threshold amount (e.g., one second) or some other statistical measure (e.g., one standard deviation) and, accordingly, identify a component of the network located in the first geographic region as a cause of one or more delays in call setup processes. Additionally, although the term "average call setup time" is used herein, it is contemplated that, for example, medians of the respective call setup times in the geographic regions could be compared instead of averages.

As another example, the corrector 226 can determine a disparity between the call setup time (i.e., the network-observed call setup time previously described) and a UE-observed call setup time. The corrector 226 (and/or the receiver 222) can receive data for the call from the first UE 206. The data can include a first timestamp at which the first UE 206 transmitted the call initiation indication to the first RAN node 202 and a second timestamp at which the first UE 206 received the call delivery indication (e.g., from the first RAN node 202). The corrector 226 (and/or the analyzer 224) can determine the UE-observed call setup time by calculating the difference between the first and second timestamps. Alternatively, in some aspects, the data received from the first UE 206 includes a pre-calculated setup time for the call.

In aspects, the corrector 226 compares the network-observed and UE-observed setup times (e.g., for the same call). If the difference reveals a disparity that exceeds a threshold (e.g., one second), it is possible that, for example, radio frequency (RF) communication conditions between the first UE 206 and the first RAN node 202 may have deteriorated (e.g., due to a physical obstruction between the first UE 206 and the first RAN node 202). That is, a large disparity between network- and UE-observed call setup times can indicate a problem causing delays in communications between the first UE 206 and the first RAN node 202. Accordingly, based on determining that the disparity exceeds a limit, the corrector 226 can instruct the first UE 206 to use a different RAN node (e.g., initiate a cell reselection procedure).

In the same or other aspects, based on determining that the disparity between the network- and UE-observed call setup times exceeds the limit, the corrector 226 determines that the first RAN node 202 is malfunctioning. Based on such a determination, when a subsequent call initiation indication is received at the first RAN node 202 from a third UE, the corrector can set up a call for the third UE using a third RAN node (e.g., a different RAN node for which the third UE is within an operating range) instead of the first RAN node 202. As a result, the third UE may avoid the same call setup delay experienced by the first UE 206.

Figure 3:
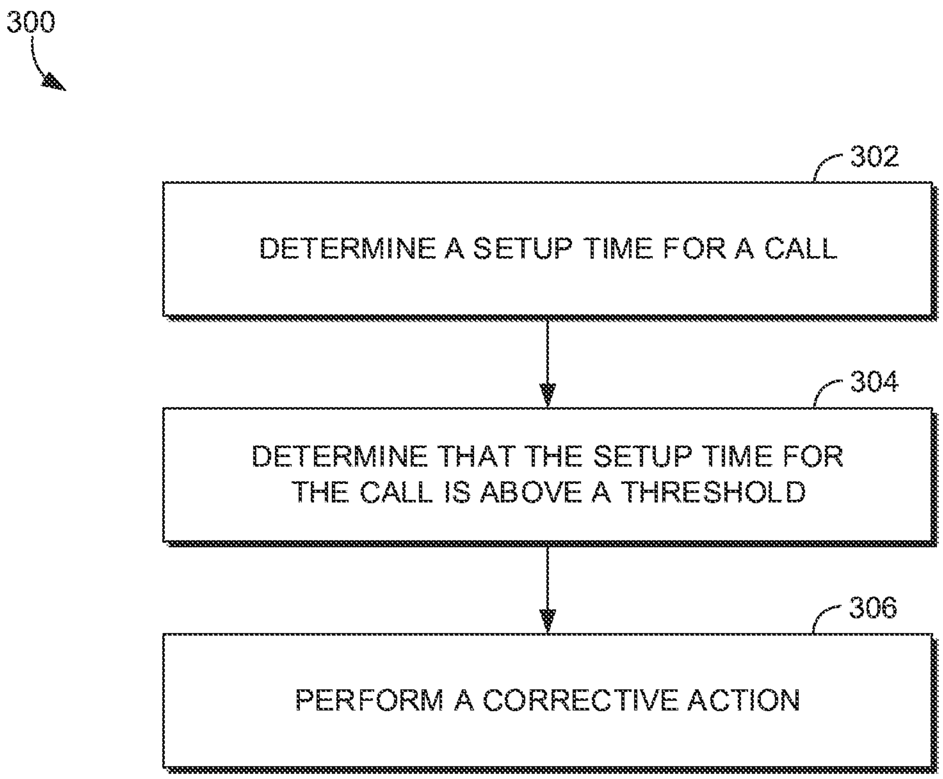
FIG. 3 depicts a flow diagram of an exemplary method for mitigating disruptions to a telecommunications network, in accordance with aspects of the present disclosure.

Turning now to FIG. 3, FIG. 3 depicts a flow diagram of a method 300 for mitigating disruptions to a telecommunications network. The method 300 comprises a first step 302 wherein a setup time is determined for a call. The setup time can be determined be determining a difference between a first time at which a call initiation indication was received at a RAN node and a second time at which a call delivery indication was transmitted by the RAN node.

At a second step 304, it is determined that the call setup time is above a threshold. The threshold can be retrieved from a database, such as the database 212. The threshold can be three seconds, for example.

At a third step 306, a corrective action is performed. The corrective action can include, for example, comparing performance of network components in different geographic regions, comparing performance of RAN nodes that utilize one or more of the same network components, and/or comparing network-observed call setup time to UE-observed call setup time. If a discrepancy is identified between the performance of different network components (e.g., different RAN nodes or different geographic regions), a network component contributing to the call setup time can be identified, replaced, supplanted (e.g., by setting up calls from a different RAN node), and/or repaired.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for mitigating disruptions to a telecommunications network comprising:

determining a setup time for a first call between a first user equipment (UE) and a second UE by determining a difference between:

a first time at which a first call initiation indication for the first call was received from the first UE at a first radio access network (RAN) node of the network, and a second time at which a call delivery indication for the first call was transmitted from a second RAN node of the network to the first UE, wherein the call delivery indication indicates that the second UE has received a request to join the first call;

determining that the setup time for the first call is above a threshold; and based on the determining that the setup time for the first call is above the threshold, performing a corrective action, wherein the performing the corrective action comprises:

determining a geographic region of the first UE; and determining a first average setup time of a plurality of calls initiated within the geographic region.

2. The method of claim 1, wherein the performing the corrective action comprises communicating an alert and displaying an indication of the alert at a user interface, and wherein the indication of the alert comprises information regarding the setup time for the first call.

3. The method of claim 1, wherein the performing the corrective action comprises identifying a malfunctioning component of the network.

4. The method of claim 3, wherein the performing the corrective action further comprises:

determining that one or more call setup times associated with a third RAN node of the network are below the threshold, wherein the third RAN node uses one or more core network components used by the first RAN node or the second RAN node; and based on the determining that the one or more call setup times associated with the third RAN node are below the threshold, determining that the malfunctioning component of the network is the first RAN node or the second RAN node.

5. The method of claim 3, wherein the performing the corrective action further comprises:

determining that one or more call setup times associated with a third RAN node of the network are above the threshold, wherein the third RAN node uses one or more core network components used by the first RAN node or the second RAN node; and based on the determining that the one or more call setup times associated with the third RAN node are above the threshold, determining that the malfunctioning component of the network is at least one of the one or more core network components.

6. The method of claim 1, wherein the performing the corrective action further comprises:

determining a second average setup time of a plurality of calls initiated with a second geographic region, wherein the second geographic region is different than the first geographic region;

determining that the first average setup time is greater than the second average setup time; and based on the determining that the first average setup time is greater than the second average setup time, identifying a component of the network as a cause of delays in call setup processes, wherein the component of the network is located in the first geographic region.

7. The method of claim 1, wherein the threshold is at least three seconds.

8. The method of claim 1, wherein the performing the corrective action comprises:

receiving data for the first call from the first UE;

based on the data, determining a UE-observed setup time for the first call for the first UE; and determining a disparity between the setup time for the first call and the UE-observed setup time for the first call.

9. The method of claim 8, wherein the performing the corrective action further comprises:

determining that the disparity exceeds a limit; and based on the disparity exceeding the limit, instructing the first UE to initiate a cell reselection procedure.

10. The method of claim 8, wherein the performing the corrective action further comprises:

determining that the disparity exceeds a limit;

based on the disparity exceeding the limit, determining that the first RAN node is malfunctioning;

receiving a second call initiation indication from a third UE located within an operating range of the first RAN node; and setting up a second call for the third UE using a third RAN node instead of the first RAN node, wherein the first RAN node is different than the third RAN node.

11. A computerized system comprising:

one or more processors; and a non-transitory computer storage media storing computer-usable instructions that, when used by the one or more processors, cause the one or more processors to:

determine a setup time for a first call between a first user equipment (UE) and a second UE by determining a difference between:

a first time at which a first call initiation indication for the first call was received from the first UE at a first radio access network (RAN) node of the network, and a second time at which a call delivery indication for the first call was transmitted from a second RAN node of the network to the first UE, wherein the call delivery indication indicates that the second UE has received a request to join the first call;

determine that the setup time for the first call is above a threshold; and based on the determining that the setup time for the first call is above the threshold, perform a corrective action, wherein the performing the corrective action comprises:

determining that one or more call setup times associated with a third RAN node of the network are below the threshold, wherein the third RAN node uses one or more core network components used by the first RAN node or the second RAN node; and based on the determining that the one or more call setup times associated with the third RAN node are below the threshold, determining that a malfunctioning component of the network is the first RAN node or the second RAN node.

12. The computerized system of claim 11, wherein the performing the corrective action comprises communicating an alert such that an indication of the alert is displayed at a user interface, and wherein the indication of the alert comprises information regarding the setup time for the first call.

13. One or more non-transitory computer storage media storing computer-useable instructions that, when used by a computing device, cause the computing device to perform operations, the operations comprising:

determining a setup time for a first call between a first user equipment (UE) and a second UE by determining a difference between:

a first time at which a first call initiation indication for the first call was received from the first UE at a first radio access network (RAN) node of the network, and a second time at which a call delivery indication for the first call was transmitted from a second RAN node of the network to the first UE, wherein the call delivery indication indicates that the second UE has received a request to join the first call;

determining that the setup time for the first call is above a threshold; and based on the determining that the setup time for the first call is above the threshold, performing a corrective action, wherein the performing the corrective action comprises:

receiving data for the first call from the first UE;

based on the data, determining a UE-observed setup time for the first call for the first UE; and determining a disparity between the setup time for the first call and the UE-observed setup time for the first call.

14. The one or more non-transitory computer storage media of claim 13, wherein the performing the corrective action further comprises:

determining that the disparity exceeds a limit; and based on the disparity exceeding the limit, instructing the first UE to initiate a cell reselection procedure.

15. The one or more non-transitory computer storage media of claim 13, wherein the performing the corrective action further comprises:

determining that the disparity exceeds a limit;

based on the disparity exceeding the limit, determining that the first RAN node is malfunctioning;

receiving a second call initiation indication from a third UE located within an operating range of the first RAN node; and setting up a second call for the third UE using a third RAN node instead of the first RAN node, wherein the first RAN node is different than the third RAN node.

* * * * *